(12) United States Patent
Travers

(10) Patent No.: US 7,421,976 B1
(45) Date of Patent: Sep. 9, 2008

(54) FISH STAND THAT CATCHES WATER

(76) Inventor: Jonathon J. Travers, P.O. Box 1169, Westport, MA (US) 02790

( * ) Notice: Subject to any disclaimer, the term of this patent is extended or adjusted under 35 U.S.C. 154(b) by 111 days.

(21) Appl. No.: 11/509,134

(22) Filed: Aug. 24, 2006

(51) Int. Cl.
*A01K 63/00* (2006.01)
(52) U.S. Cl. ........................... 119/264; 119/269
(58) Field of Classification Search ............... 119/264, 119/269, 251, 246, 247; D30/101, 106
See application file for complete search history.

(56) References Cited

U.S. PATENT DOCUMENTS

| | | | |
|---|---|---|---|
| 2,002,380 A * | 5/1935 | Gilbert et al. ............... 47/69 |
| 3,759,223 A | 9/1973 | D'Andrea | |
| 3,841,267 A | 10/1974 | Miller | |
| 5,007,557 A * | 4/1991 | Spence ................... 220/571 |
| 5,263,772 A | 11/1993 | Ritzow | |
| 5,579,703 A | 12/1996 | King | |
| D377,242 S | 1/1997 | Kelley | |
| 5,690,054 A * | 11/1997 | Allen ..................... 119/259 |
| 6,484,669 B1 * | 11/2002 | Mihlbauer ............... 119/245 |
| 7,165,749 B2 * | 1/2007 | Venezia ................... 248/146 |

* cited by examiner

*Primary Examiner*—Yvonne R. Abbott
(74) *Attorney, Agent, or Firm*—Lawrence J. Gibney, Jr.

(57) ABSTRACT

This device will allow an aquarium owner to easily monitor whether or not condensation or leakage is emanating from his/her aquarium. The water is gathered in a collection bin at the base of this device and can be drained from the device by the owner.

2 Claims, 3 Drawing Sheets

FISH STAND THAT CATCHES WATER

BACKGROUND OF THE INVENTION

A. Field of the Invention

This device relates to ensuring that the water from a fish tank is collected in a central bin to avoid damage to the surface below the fish tank. This device is made in a single piece and will be equipped with a gauge to easily inform the owner of the amount of water that is collected in the collection bin. Storage cabinets in the front of the structure will also be provided. The bin will be hidden from view by the structure of the device.

B. Prior Art

There are many other examples, which exist in the prior art, which address the problem of leakage or condensation from a fish tank. A representative example of one type of device is Spence, U.S. Pat. No. 5,007,557. This device is a spill container, which comprises a receptacle for collecting leaking fluid. Another example, in the prior art is D'Andrea, U.S. Pat. No. 3,759,223. The D'Andrea device is an aquarium, which allows the drainage of sediment and/or water from the aquarium into a central station or collection point. Another example is Ritzow, U.S. Pat. No. 5,263,772.

Although the prior art references address the concerns of collecting condensation or leaking water from an aquarium, the current application achieves the desired result in a unique manner. Additionally, none of these devices achieve the stated goal of allowing an individual owner to quickly determine if the fish tank is producing excessive leakage and needs to be better maintained or monitored.

BRIEF SUMMARY OF THE INVENTION

This is the one-piece device on which an aquarium will rest. The device is probably made from hard plastic but may be made from other material as well. It is designed to be constructed as one piece for the convenience of the aquarium owner and for the aesthetics of the homeowner.

The fish tank or aquarium rests on the top surface of this unit. The top surface has sides but is open under the aquarium bottom. The device should be of sufficient strength to support an aquarium that contains water. The top surface has a central opening and a series of side structures with a predetermined amount of thickness.

The top surface has a series of grooves or holes around the perimeter of the sides that allow the water to drain from the tank to a central bin. These holes or grooves direct the water to a central collection bin, which is located in the center of the interior of the unit. Doors on the front of the unit cover the interior components of this device and are hinged to allow access to the interior. The doors allow access to a storage area.

The bin to collect the water is in the center of this particular unit and rests on a base, which is a solid flat member. A gauge, which is clearly visible from the outside, allows the aquarium owner to determine how much water has been collected in the collection bin so that the bin can be changed in a timely fashion before the water damages the flooring of the home or business. The base must be designed to support the weight of the unit as well as a full aquarium.

It is an object of this device to trap water in one central location, which may leak from an aquarium. For the stand to work properly, it will also be able to hold all of the water in the aquarium when it leaks, as well as an additional five or ten gallons of water. For example, if the aquarium holds fifty-five gallons of water, the stand will accommodate sixty-five gallons of water in the bin in case of a faulty aquarium. It is a further object of this device to maintain the aesthetics of the home.

DETAILED DESCRIPTION OF THE EMBODIMENT

Figure 1:
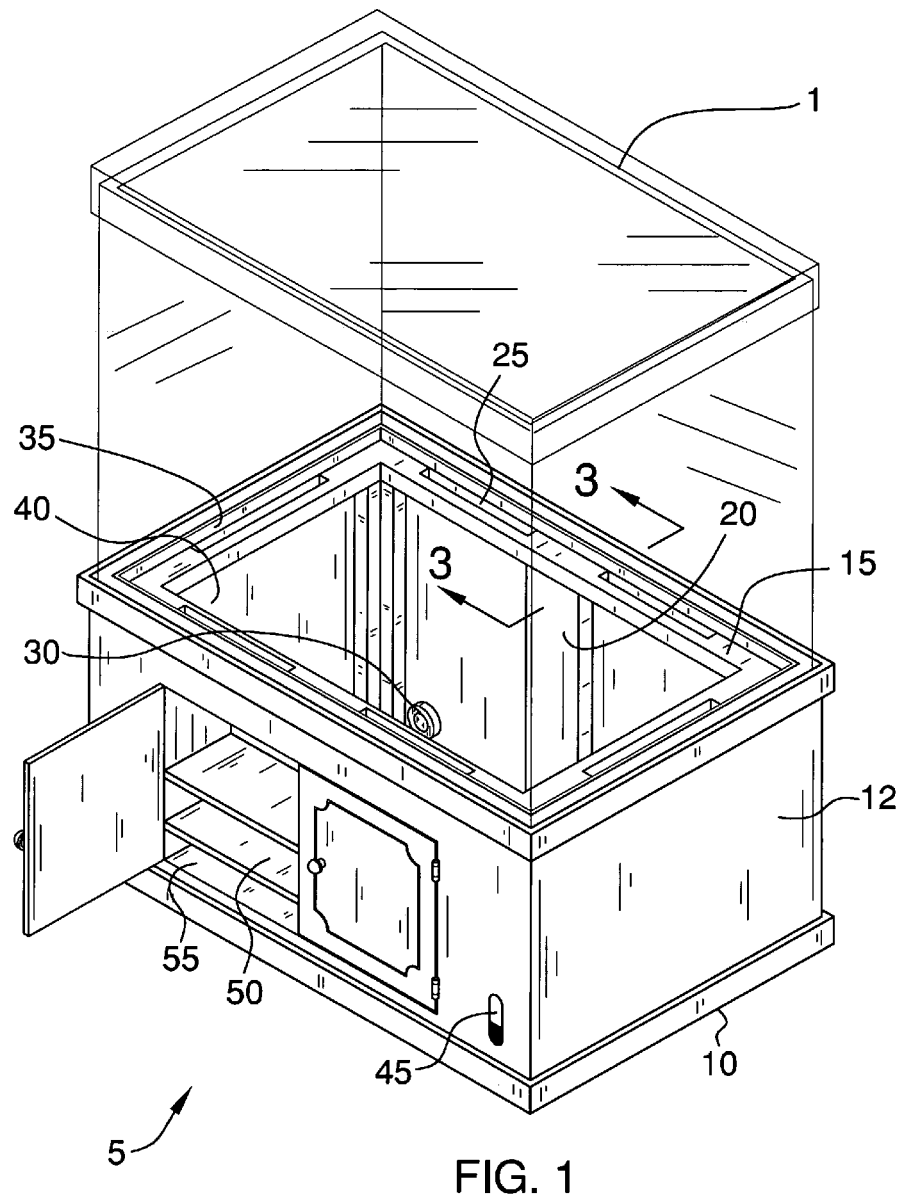
FIG. 1 is an isometric front view of the device with the fish tank outlined.
Figure 2:
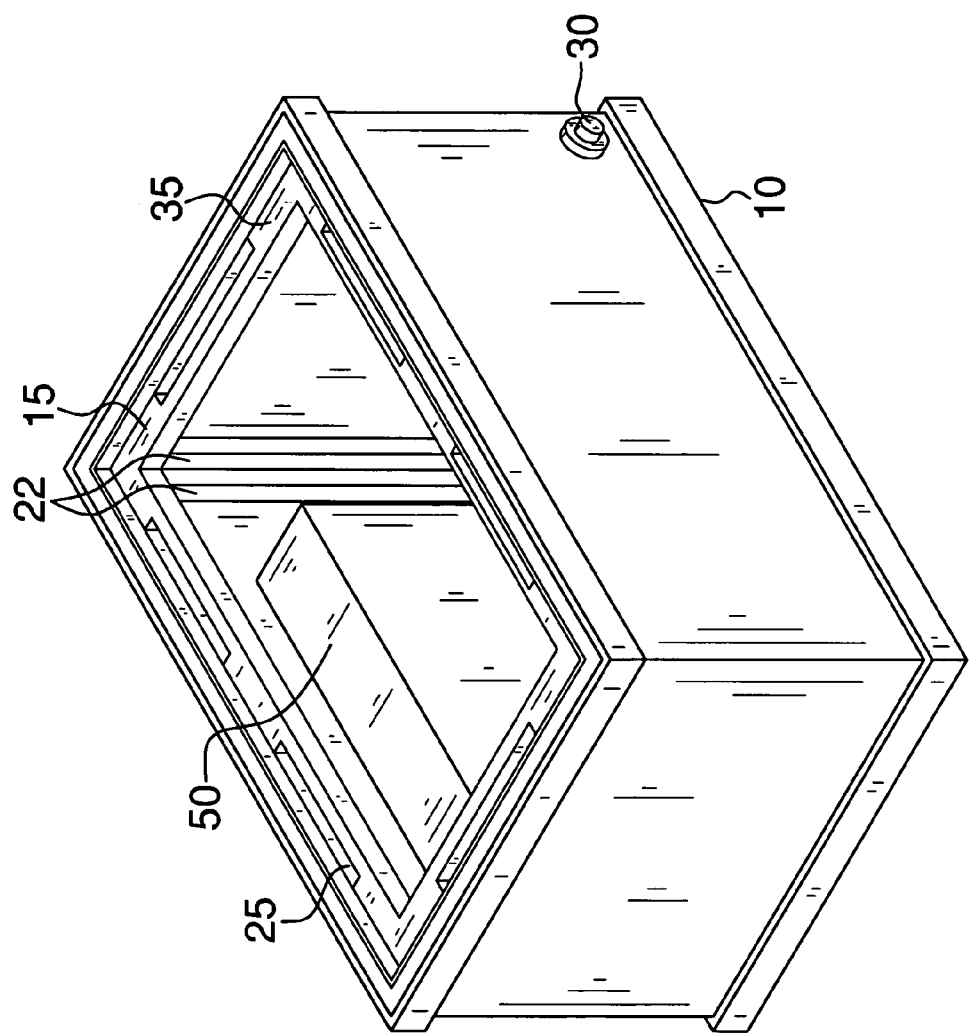
FIG. 2 is an isometric rear view of the device with the fish tank not depicted.

In order to prevent damage to the flooring beneath an aquarium it is important to have a means to catch any water that may leak from the aquarium. This leakage may be caused by a spill or be a leak in the aquarium. The fish tank 1 or aquarium is not being claimed as part of this device but is integral to its operation of this device.

The device 5 is a cabinet or stand upon which a fish tank 1 rests. The cabinet will have defined exterior sides 12 and will rest on a base 10. The fish tank 1 rests on the top surface of flat planar members. The top surface would be constructed to be open in the middle but have a flat planar surface 15 with raised sides 35 that from a cavity into above which the fish tank 1 will be placed. The aquarium bottom surface rests on the flat planar surface 15.

Figure 3:
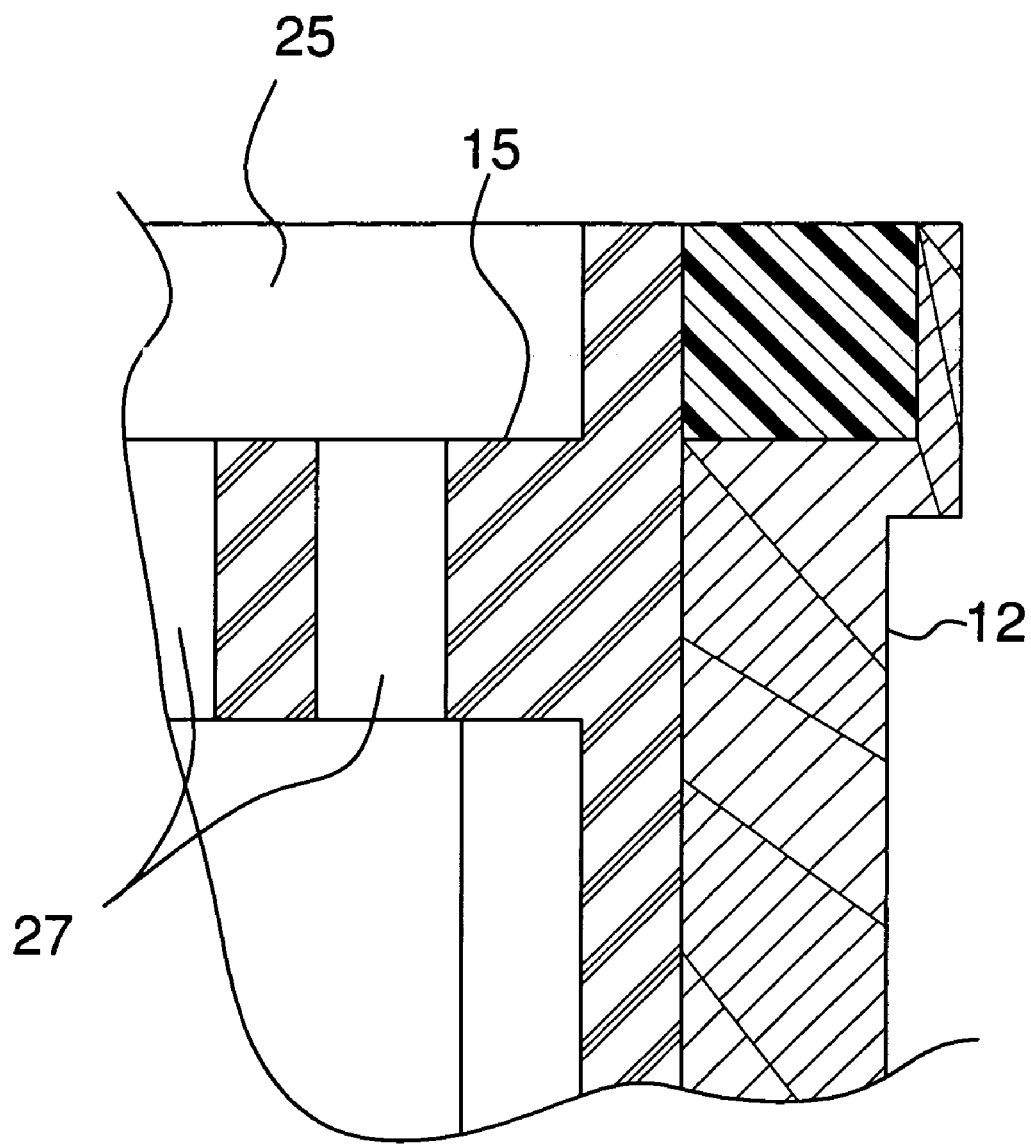
FIG. 3 is a view according to line 3-3 on FIG. 1.

A plurality of slots 25 is located around the perimeter on the sides 15. Water travels from the slots 25 through a series of internal cavities 27 such as depicted in FIG. 3 to a collection bin located above the interior of the stand. The base structure must be constructed to support the weight of the device and the weight of a full aquarium. The collection bin would be situated within the interior of the stand.

As water leaks or condenses from the aquarium, it is directed into the slots or holes. These holes or grooves are placed around the perimeter of and surround the top surface on the sides 15. The grooves direct the water to the collection bin, which is located in the interior of the stand.

On the outside of the device is a water level gauge 45, which will easily inform the aquarium owner about the level of water, which is contained in the collection bin, 55.

A drain plug 30 may also be installed to allow the aquarium owner to drain the bin 55 in the event that the water level exceeds a predetermined level. The width of the top surface of the device will be determined by the dimensions of the fish tank 1.

The aquarium 1 rests on the top surface of this device. The holes 25 are placed on the top surface and provide a means to drain any water, which may leak. The top surface on which the holes are provided are fitted with rubber disks to provide space between the surfaces for water to drain into the main collection bin.

Additionally braces 20 along the top surface and in the corners 22 may also be required or desired to insure that the device can support the weight of a full aquarium. The grooves or holes 25 allow all water to be funneled or channeled into the bin which is in the interior of the stand. The braces 20 provide additional support due to the weight of the fish tank.

Additionally, there may be additional bracing 35 around the top surface to prevent the device from swaying side to side.

A storage space 50 in the front of the device will provide a storage area for accessories that may be used with any fish tank.

The inventor claims:

1. A device to collect water from a fish tank, which is comprised of:

a. a cube structure with a bottom surface, a top surface, and four side surfaces of predetermined dimensions;

wherein the top surface has four side walls but is open;
wherein the side walls are constructed with a predetermined thickness;
b. a base;
wherein the base supports the device;
wherein the base has a predetermined size;
wherein the base allows the device to be slightly elevated;
c. means to collect the water;
d. a plurality of holes;
wherein the plurality of holes allow water to drain from the tank to a bin;
e. drains;
wherein a series of drains are placed around the perimeter of the top surface;
wherein the drains are connected to the holes and to the collection bin;
wherein the collection bin rests on the top of the base;
said collection bin is located in the interior of the structure;
f. braces;
wherein braces are provided to support the weight of the aquarium;
g. a means to measure a quantity of water;
wherein the quantity of water in the bin is measured.

2. The device as described in claim 1 wherein the means to measure a quantity of water is a water level gauge.

* * * * *